Nov. 12, 1946.   H. LANGSTROTH ET AL   2,410,827
SCANNING DEVICE
Filed June 28, 1943   2 Sheets-Sheet 1

INVENTORS
H. LANGSTROTH
F. C. WALLACE
BY
ATTORNEY

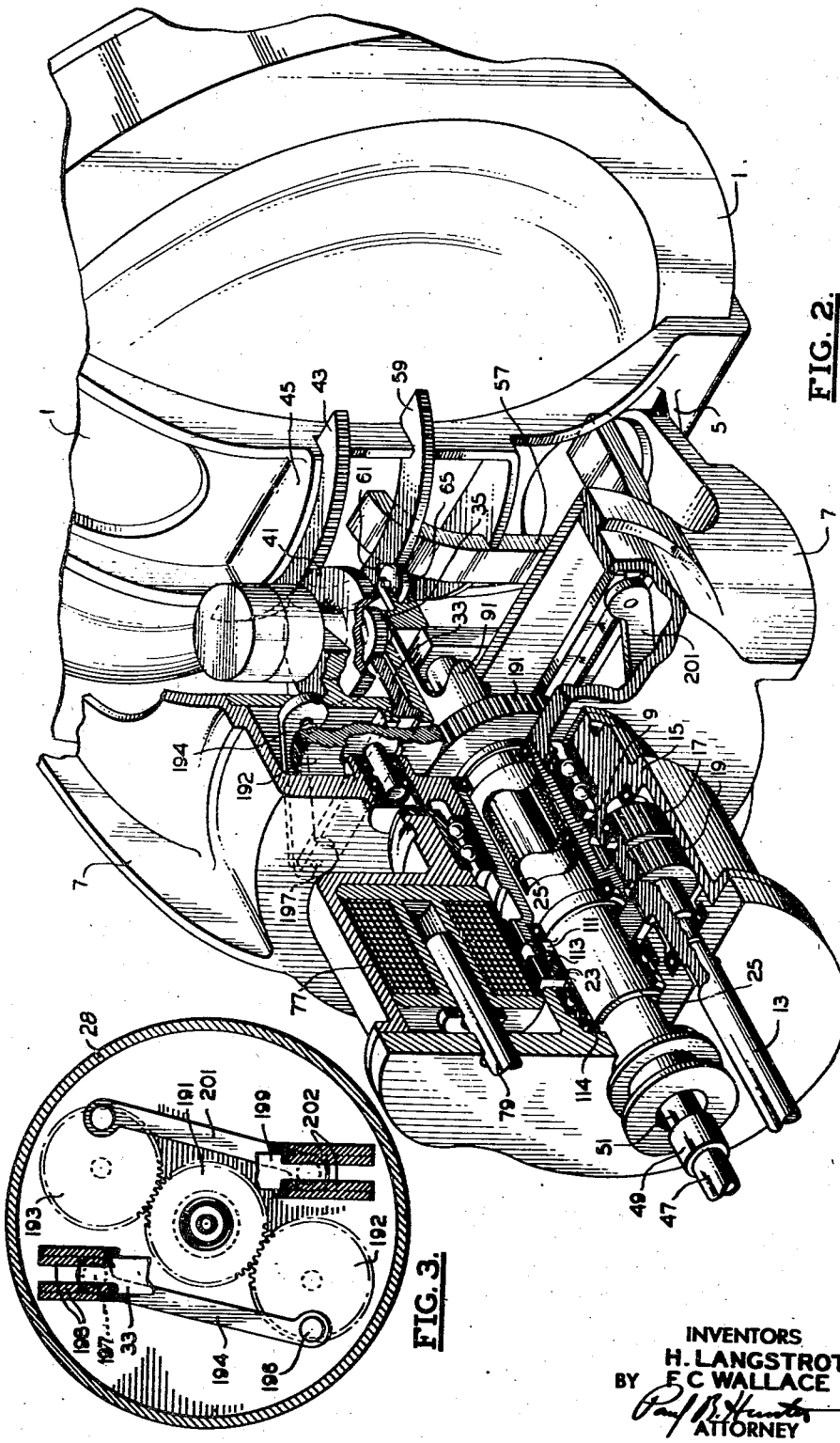

Patented Nov. 12, 1946

2,410,827

UNITED STATES PATENT OFFICE 2,410,827

SCANNING DEVICE

Hall Langstroth, Greenwich, Conn., and Fred C. Wallace, New York, N. Y., assignors to Sperry Gyroscope Company, Inc., a corporation of New York Continuation of application Serial No. 438,398, April 10, 1942, now Patent No. 2,407,305, dated September 10, 1946. This application June 28, 1943, Serial No. 492,566

6 Claims. (Cl. 250—11)

The present invention relates to scanning devices for scanning highly directive radiant energy radiation or receptivity patterns over a predetermined conical solid angle. More particularly, the present application is a continuation of our copending application Serial No. 438,398, filed April 10, 1942, for Scanning devices, now patent 2,407,305, issued September 10, 1946.

In many types of devices, such as object detectors, it is necessary to project or receive a sharply directional radiant energy radiation or receptivity pattern and to scan this pattern over a definite portion of a sphere, especially for the purpose of obtaining radiant energy reflections from any object which may be in the field of this radiation and for using such reflected radiation to indicate the presence and/or position of the reflecting object. It is also desirable to interrupt this scanning motion when an object has been detected and to produce a conical motion having a very small apex angle, such as of the order of four degrees, for the purpose of giving a finer and more accurate indication of the position of the reflecting object.

In the present invention a beam of radiant energy, such as a high frequency radio beam, is projected from a suitably highly directional radiator which is caused to oscillate slowly or "nod" about an axis substantially perpendicular to the direction of the beam. At the same time, this "nod" axis itself is rotated at a fairly high speed about a "spin" axis normal to the "nod" axis so that the beam in effect sweeps out a spiral pattern caused by the widening of the circles produced by the fast spin motion in response to the slow nod motion. Accordingly, the present device is enabled to scan in a spiral fashion a substantially conical portion of the sphere whose extent is determined by the angular limits of the nod oscillation. In addition, means are provided for substantially instantly changing this spiral scanning motion of the beam into a small conical scan by interrupting the nod motion near its zero position and retaining only the spinning motion. The apex angle of this conical scanning is obtained by off-setting the orientation of the beam from the axis of spin.

Accordingly, it is an object of the present invention to provide an improved apparatus for scanning a predetermined portion of the sphere by a directional radiation or receptivity pattern.

It is another object of the present invention to provide improved devices for scanning a highly directional radiation or receptivity pattern in a spiral.

It is still another object of the present invention to provide improved devices for effecting spiral scanning and for converting such spiral scanning into fixed conical scanning.

Further objects and advantages of the present invention will be apparent from the following specification and drawings.

Fig. 2 is a perspective view, partly in section, of the device shown in Fig. 1.

Fig. 3 is a section view taken on line 3—3 in Fig. 1, and

Figure 1:
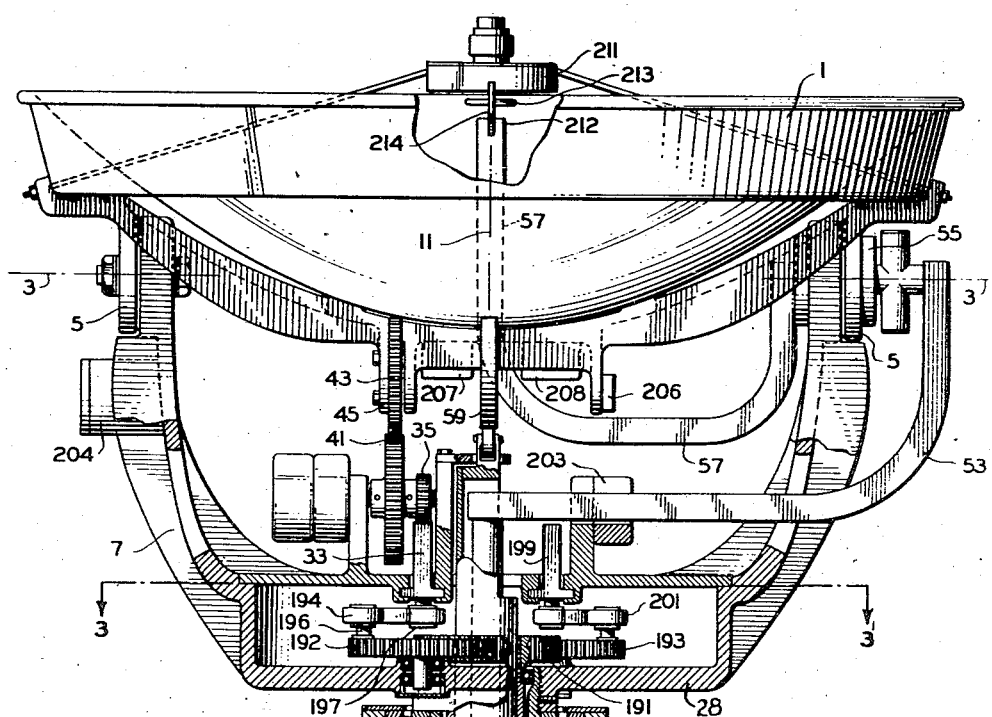
Fig. 1 is an elevation view, partly in section, showing a scanning device constructed in accordance with the present invention.

Referring to Figs. 1 and 2, a suitable directional radiating or receiving arrangement for radiant energy, such as a metallic reflector 1 preferably of paraboloidal form and containing a suitable antenna arrangement, is supported for oscillation about an axis 3 by means of suitable brackets 5 fixed to reflector 1 and pivotally mounted in a yoke 7, which is integrally formed with or fastened to a sleeve 9 whose axis 11 is perpendicular to axis 3. Axis 3 is termed the nod axis, and axis 11 the spin axis. Any suitable type of motive means, such as an electric motor (not shown), is connected to drive an input shaft 13 that has bearings mounted in a fixed casing 15. A single pinion is fastened to shaft 13 that is the equivalent of two pinions, the same having toothed areas 17 and 19. Shaft 13 rotates at a fixed speed. The toothed area 17 of the pinion meshes with a pinion 21 fixed to or integrally formed on sleeve 9, such mechanism causing the yoke and reflector of the scanning device to continuously rotate or spin about the axis 11 thereof. Meshing with toothed area 19, which is also continuously rotated by shaft 13, is a further pinion 23 which is connected to a second sleeve 25. Sleeve 25 is concentrically mounted with relation to sleeve 9, the same being coaxial. The sleeve 25 is also rotatable with respect to the sleeve 9.

As shown in Fig. 3, a pinion 191 is fastened to the upper end of sleeve 25. Pinion 191 meshes with two symmetrically located pinions 192 and 193 mounted to rotate in the base of yoke 7. Rack 33 of the oscillation or nod driving mechanism is driven by a connecting rod 194 eccentrically pivoted at one end 196 to pinion 192. The other end of the rod 194 is pivotally connected to the rack 33 as indicated at 197. Rack 33 is adapted to slide within suitable guides 198 in the fixed cover piece for the yoke. Rack 33 drives a pinion 35 which in turn actuates the meshing pinion 41 and sector gear 43. Gear 43 is directly mounted on the reflector 1 in a position to rock or oscillate the scanning device about its nod axis 3.

As described above, yoke 7 and reflector 1 continuously spin about axis 11 at a predetermined speed. The gear ratio between pinions 19, 23 is chosen to be slightly different than the gear ratio between pinions 17, 21, so that gear 191 is driven at a slightly different rate than that of the yoke 7. This difference is the rate of nod, the same producing translation of the rack 33 and consequent movement of the reflector 1 of the scanning device about its nod axis. Since the rate of nod is much slower than the rate of spin, it will be clear that the axis of symmetry of reflector 1 is caused to sweep out a series of widening or narrowing circles, the circles being generated by spinning about spin axis 11 and the widening or narrowing being caused by nodding about nod axis 3. This in effect produces a spiral scanning of the axis of the reflector 1 over a predetermined solid angle.

If the system is to act as a radiator, the radiant energy to be radiated from reflector 1 is introduced through a suitable wave guide 47. In view of the fact that the radiating arrangement is spinning rapidly about spin axis 11 it is necessary to provide a suitable rotating joint 49 for coupling the stationary portion 47 of the wave guide to the rotating portion 51 carried by yoke 7. Suitable types of rotating joints are shown in copending application Serial No. 429,494, for Directive antenna structure, filed February 4, 1942, in the names of R. J. Marshall, W. L. Barrow and W. W. Mieher. Rotating wave guide 51 is then bent around in an arc to extend to a position along the nod axis 3 as indicated at 53. Here again, since the reflector 1 oscillates about nod axis 3 with respect to yoke 7, a further rotating joint indicated at 55 is provided between the section 53 carried by the yoke 7 and section 57 of the wave guide carried by the reflector 1.

When conical scanning is desired in the arrangement set forth, it is necessary to interrupt the nodding motion and to fix the reflector 1 at a predetermined position in its nod cycle. Preferably the termination of the wave guide 57 is so adjusted that the orientation of the maximum directivity of the radiation pattern of the reflector 1 is at a slight angle to the axis of spin 11 even in the position of zero nod. Such an angle is chosen to be the apex angle of the conical type of scanning. This angle may be formed by selecting the proper zero nod condition, or by offsetting the antenna within reflector 1.

In this connection, a suitably shaped cam or locking piece 59 is fixed to the back of the reflector 1. With reference to Fig. 2, cam 59 is notched as indicated at 61 at the position corresponding to zero nod of reflector 1, that is, at the position where the axis of symmetry of reflector 1 is most nearly coincident with spin axis 11, differing therefrom only by the apex angle defined above. Cooperating with cam 59 is a roller or detent 65 that is mounted on the end of a third sleeve 91. This sleeve is concentric to the sleeves 25 and 9 and moves translationally with respect thereto. Sleeve 91 is movable upwardly as viewed in Fig. 1, by means of a suitable solenoid 77 fastened to casing 15. Upon energization of the solenoid, its magnetic armature or plunger 79 is forced downwardly as viewed in Fig. 1, thereby rocking bell crank 83 about pivot 85. One end of the crank 83 carries a roller 87 which operates in a pair of guides 89 formed on the third sleeve 91 to lift the roller 61 into cooperative engagement with the cam 59. At the same time that detent 65 slips into the notch 61 on the cam 59, a key 111, Fig. 2, on the sleeve 91 slips out of a notch 113 in pinion 23 by which the pinion is coupled to the sleeve 25. This disengages the sleeve 25 and its driving pinion 23 so that the nod movement of the scanning device is interrupted. Key 111 slides in a groove 114 in the sleeve 25 and projects through the same into the axial notch 113 in the pinion 23.

Figs. 1 and 3 also illustrate the type of weight balancing necessary for effective operation of the scanner. Thus, it will be clear that proper balance about the spin axis 11 is required to prevent dynamic unbalance and consequent disrupted vibration.

One important problem of balancing is concerned with the motion of rack 33, which, as will be seen, continually varies its weight distribution with respect to spin axis 11. In order to provide balance for this continually shifting mass, a gear 193 fully symmetrical with 192 is provided, which moves a mass 199 having a weight and shape similar to that of rack 33. Mass 199 is caused to oscillate equally and oppositely to rack 33 as by means of a similar connecting rod 201.

From Fig. 3 especially, it will then be clear that during rotation of gear 191 the center of gravity of the system comprising gears 192 and 193, connecting rods 194 and 201, guides 198 and 202, and rack 33 and counterweight 199 will always coincide with axis 11, thereby providing a static balancing of the masses within housing 28.

For dynamic balancing it is further necessary that the resultant moments of each of these masses in the plane of Fig. 1 taken about any point of axis 11, shall be equal and opposite. It will be clear that this condition is also met by the counter-balancing device just described.

A further mass 203 is provided which effectively serves to counterbalance both statically and dynamically the mass of gears 35 and 41 and their bearings. Another mass 204 may be provided to counterbalance the effect of the high frequency wave guide 53. By these devices it will be clear that all parts of the spinning yoke and members fixed thereto may be suitably balanced to provide a smooth vibrationless rotation.

Figure 4:
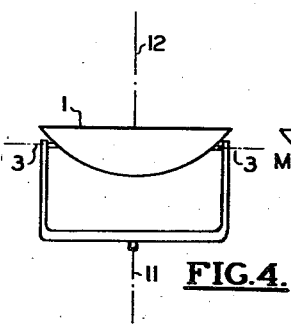
Figs. 4, 5, 6 and 7 are schematic diagrams employed in explaining the dynamic balancing of the device.

It is also necessary to provide suitable counterweights for the parabola 1. Figs. 4 to 7 illustrate schematically various conditions occurring during various portions of the nod cycle. Fig. 4 illustrates schematically the same view shown in Fig. 1, showing the parabola 1 at zero nod position with respect to nod axis 3. It will be clear that if the weight distribution of parabola 1 is made symmetrical with its axis of symmetry, such as 12, dynamic and static balance both will be obtained at least in this position of zero nod.

To produce this condition of balance, a mass 206 may be added to compensate for the effect of gear sector 43 and its mounting. The weight of wave guide section 57 may be also counterbalanced by suitable choice of the masses and location of bracket 45 and weight 206. Therefore, the parabola 1 may be substantially balanced when in position of zero nod shown in Fig. 4.

Figure 5:
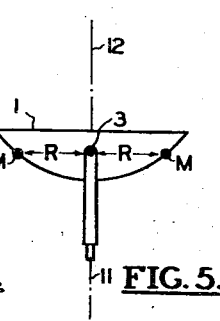
Figures 6, 7:
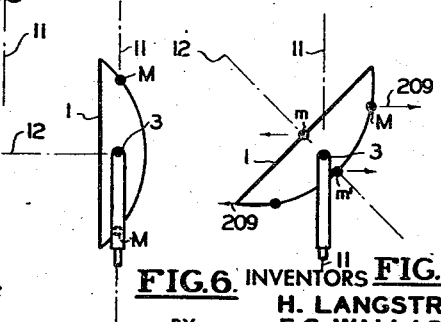

Figs. 5, 6 and 7 show a schematic side view representation of the mechanism similar to Fig. 4, taken during various nod positions, Fig. 5 representing zero nod, Fig. 6 90° nod, and Fig. 7 an intermediate or 45° nod. By suitable choice of location of axis 3 relative to parabola 1 it is possible to balance the parabola 1 about axis 11 when in the position of 90° nod shown in Fig. 6. This may necessitate the use of certain counterweights 207 and 208 which, since they are placed symmetrically with respect to the axis of symmetry of parabola 1, will have no effect upon the balancing when in the zero nod position of Fig. 5.

The balanced condition obtained thus far is wholly satisfactory for static conditions, as in effect the center of gravity of the parabola system is thereby put at the intersection of axes 3 and 11. However, during other positions of nod a dynamic couple is obtained which may be illustrated by reference to Figs. 5–7.

Thus, as is well known, a spinning mass may be schematically represented by a concentrated mass spinning about the axis of rotation and located therefrom at a distance equal to the radius of gyration of the spinning body. Since a static balance has already been obtained, a more accurate picture would be obtained by two concentrated point masses such as M, each having a mass equal to one-half the total parabola system mass and each separated from axis 11, as shown in Fig. 5, by a distance R equal to the radius of gyration of parabola 1.

During spinning in the position shown in Fig. 6, it will be clear that these masses M are still statically and dynamically balanced about axis 11. However, in the position shown in Fig. 7, centrifugal effects acting on these masses will produce forces in the direction of the arrows 209, which will produce an unbalanced couple or moment tending to cause excessive vibration. In order to balance this effect it is necessary to provide a moment in the opposite direction having equal value. This may be done by the addition of masses such as $m$, $m'$, placed in a line at right angles to axis 3 and the axis of masses M having a value such that the moments produced thereby cancel the moments of the masses M.

By choosing the location of masses $m$, $m'$, so as not to disturb the static balance already obtained, (that is, to leave the center of gravity unchanged) satisfactory dynamic balancing may be produced which is essentially independent of the nod position of the parabola 1, as may be shown by suitable analysis. This condition arises from the fact that the centrifugal forces are proportional to the radial distance from axis 11, while the moments are proportional to the axial displacement of the masses from axis 3 along direction of axis 11, whereby the moment of masses M will substantially be neutralized by that of $m$, $m'$ at all nod positions.

In accordance with the analysis just made, an extra mass 211 is added corresponding to mass $m$, and masses 207 and 208 are added on the other side of axis 3 to represent mass $m'$. In this manner, the static balance of the parabola is left unchanged while the dynamic balance is produced.

Fig. 1 also shows a suitable type of termination for wave guide 57. As here shown, wave guide 57 terminates in an open pipe 212 extending axially along parabola 1. Positioned in front of the opening of wave guide 212 is a reflector 213 of suitable metallic material which reflects the electromagnetic energy emanating from wave guide 57. Reflector 213 may be flat if desired. This reflected energy is then projected by the parabola 1 in the form of the desired highly directional beam. It will be clear that the present arrangement is also equally adapted to receive electromagnetic waves in the reverse manner. Reflector 213 may be mounted on wave guide 212 by suitable dielectric or metallic supports 214 and may serve to help support counterweight 211.

In this manner there is provided a highly satisfactory completely balanced scanning device adapted to selectively scan a spiral pattern or a conical pattern in space.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A scanning device comprising a directive antenna, a mounting yoke for the antenna rotatable about a first axis, means for pivotally mounting said antenna on said yoke for oscillating movement about a second axis normal to said first axis, means for rotating said yoke, means for oscillating said antenna including a driving pinion mounted for movement about the first axis, means for rotating said pinion at a different speed than the speed of rotation of said yoke, mechanism actuated by said driving pinion and mounted on said yoke including a driven pinion, a rack mounted for translational movement, and a rod connecting said driven pinion and rack.

2. A scanning device as claimed in claim 1, in which the oscillating means for the rack includes a sector gear fixed to said antenna and movable about said second axis, and means for communicating the motion of the rack to the sector gear.

3. A scanning device comprising a directive antenna, a support for said antenna having a spin axis, means for mounting said antenna on said support to nod about an axis normal to the spin axis thereof, means for moving said antenna about its spin axis, means for oscillating said antenna about its nod axis including a rack operatively connected to said antenna mounted to move translatably on said support, a rod connected to operate said rack, a driven pinion on said supoprt to which one end of said rod is eccentrically pivoted, and a driving pinion for said driven pinion mounted to move about the spin axis of said antenna.

4. A scanning device as claimed in claim 3, which includes means for dynamically balancing said antenna about its spin axis including a second pinion on said support driven by said driving pinion, a second rod on said support eccentrically connected to said second pinion and a second rack on said support moved by said second rod.

5. A scanning device as claimed in claim 3, in which the oscillating means for said antenna further includes a sector gear mounted on said antenna and a gear meshing with said sector gear mounted on said support and driven by said rack.

6. A scanning device comprising a directive antenna, a support for said antenna having a spin axis, means for mounting said antenna on said support to nod about an axis normal to the spin axis thereof, means for moving said antenna about its spin axis, means for oscillating said antenna about its nod axis including a member mounted to move translatably on said support operatively connected to said antenna, a rod connected to move said member, a rotatable driver on said support to which one end of said rod is eccentrically pivoted, and means for driving said driver mounted to move about the spin axis of said antenna.

HALL LANGSTROTH.
FRED C. WALLACE.